United States Patent [19]

Conley

[11] Patent Number: 4,673,235

[45] Date of Patent: Jun. 16, 1987

[54] SUBPLATE FOR A LOW-VOLTAGE ELECTRIC OUTLET

[75] Inventor: Clyde C. Conley, Tampa, Fla.

[73] Assignee: Patricia R. Conley, Tampa, Fla. ; a part interest

[21] Appl. No.: 876,173

[22] Filed: Jun. 19, 1986

[51] Int. Cl.$^4$ .............................................. H02B 1/02
[52] U.S. Cl. ...................................... 439/536; 174/58; 220/3.6; 220/3.92; 248/DIG. 6; 439/560
[58] Field of Search ............... 339/125 R, 126 R, 131, 339/122, 123; 174/58, 54-56; 220/3.3, 3.4, 3.5, 3.6, 3.8, 3.9, 3.92; 248/DIG. 6, 300

[56] References Cited

U.S. PATENT DOCUMENTS

| | | | |
|---|---|---|---|
| 2,788,187 | 4/1957 | Cookson et al. | 248/DIG. 6 |
| 3,362,667 | 1/1968 | Ginsburg | 174/58 |
| 3,424,332 | 1/1969 | Pimentel | 220/3.6 |
| 3,476,343 | 11/1969 | Burrell | 220/3.6 |
| 3,619,476 | 11/1971 | Rasmussen | 174/58 |
| 4,120,416 | 10/1978 | Suk | 220/3.4 |
| 4,451,106 | 5/1984 | Wiseheart et al. | 339/123 |
| 4,576,431 | 3/1986 | Thayer | 339/131 |

FOREIGN PATENT DOCUMENTS

| | | | |
|---|---|---|---|
| 188535 | 11/1960 | Fed. Rep. of Germany | 339/131 |
| 1192649 | 5/1970 | United Kingdom | 339/125 R |

Primary Examiner—William R. Briggs
Attorney, Agent, or Firm—Jerome A. Gross

[57] ABSTRACT

A subplate for installing a low-voltage electric receptacle plate onto a wall opening includes tab portions extending inward from clearance holes located centrally on the subplate frame. The tab portions each have two parallel lines of bend, a screw-engaging hole, and a clamping end. During installation, the tab portions are bent inward into the wall opening along the first bend lines and then backward along the second bend lines to position the tabs' clamping ends against the inner wall surface. The receptacle plate is then screwed to the subplate through the clearance holes and the inner screw-engaging apertures, tightening the clamping ends of the tab portions against the inner surface of the wall.

6 Claims, 5 Drawing Figures

SUBPLATE FOR A LOW-VOLTAGE ELECTRIC OUTLET

FIELD OF THE INVENTION

The present invention relates to a subplate used in the installation in a wall opening of a low-voltage electric outlet mounted onto a wall plate, such as used in the installation of telephone outlets, cable TV outlets, etc.

BACKGROUND OF THE INVENTION

Low-voltage electric wiring in household installations such as telephone outlets, does not require use of the metal outlet boxes required for the typical 110 volt outlets. Therefore, it is permissible to install low-voltage sockets typically mounted on receptacle plates, similar in appearance to switch plates, directly to the wall material.

One method of mounting which avoids the use of outlet boxes when mounting to board-type wall material, is shown in U.S. Pat. No. 4,576,431; this discloses a subplate for outlet sockets on such receptacle plates. That subplate has bendable horizontal legs extending from its vertical longer edges; these legs are pressed inwardly against the side edges of a wallboard opening and then outward behind the wallboard. The receptacle plate is then fastened by top and bottom screw holes into the wall material through the frame portion of the subplate.

SUMMARY OF THE INVENTION

In the present invention, broad upper and lower tabs extend inward from a subplate frame. Each of these tabs is bent inward, not against the edge of the wallboard opening, but along two parallel lines, which are weakened to facilitate bending. Immediately outward of the first of these lines is a clearance hole, spaced to correspond with the screw hole in the receptacle plate. At the same spacing inward of the second of these lines of bend is a smaller hole, to be engaged by a sheet metal mounting screw.

On mounting the receptacle plate outward of the subplate, the mounting screws do not pass through the wallboard itself, but only through the receptacle plate, the clearance holes, and the inner screw-engaging holes. On tightening these screws, the ends of the tabs (beyond the screw-engaging holes) are drawn and clamped against the inner surface of the wallboard.

DESCRIPTION OF THE PREFERRED EMBODIMENT

Figure 5:
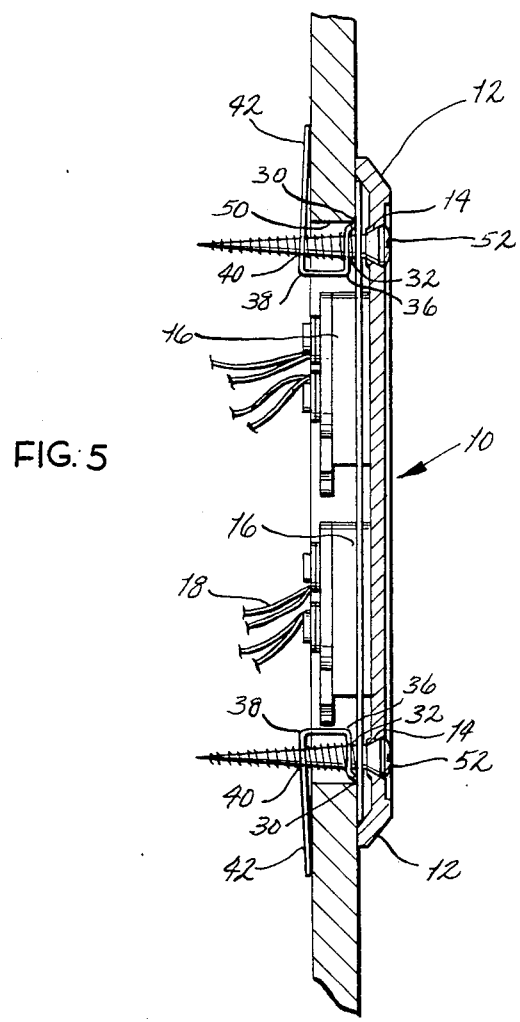
FIG. 5 is a side edge view showing the electric receptacle plate installed, with the screws tightened to bend the flanges of the subplate clampingly against the inner wall surface.

Referring first to FIG. 5, this shows a conventional telephone receptacle plate generally designated 10 of elongated rectangular shape, having a sloping framing margin 12 by which the plate portion within the margin is spaced a small distance from a wall. The receptacle plate 10 has two spaced-apart screw holes 14 for mounting onto the wall surface. Positioned between the two screw holes 14, the receptacle plate 10 mounts two conventional telephone sockets 16 shown in phantom lines, to which low-voltage wiring 18 is connected prior to securing the plate 10 against the wall surface.

Figure 1:
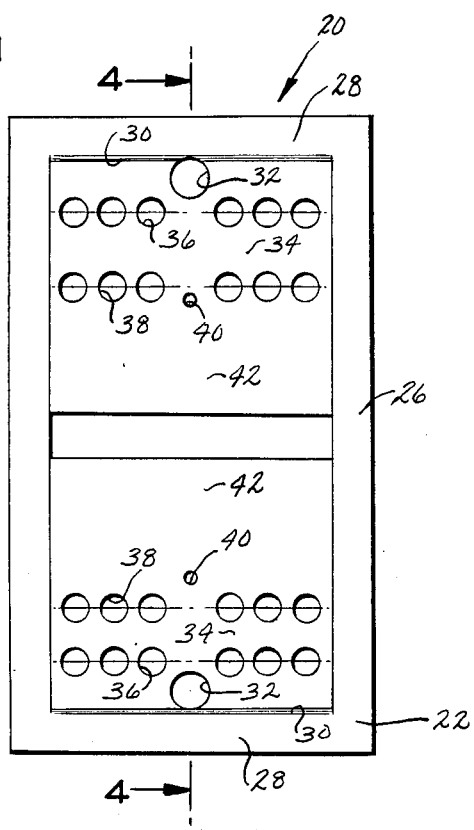
FIG. 1 is a planar view of a subplate embodying the present invention.
Figure 2:
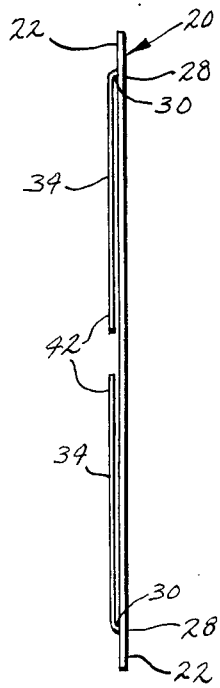
FIG. 2 is a side edge view thereof.

For mounting such a conventional receptacle plate 10 to a board-type wall material, a quickly installed subplate 20 embodying the present invention is provided. Referring to FIG. 1, the subplate generally designated 20, formed of bendable sheet metal, has an elongated planar frame portion 22, sized to fit within the framing margin 12 of the receptacle plate 10, and whose longer inner edges 26 are defined by lines of severance. Inward offsets 30 delineate the inner edges of the shorter sides 28 of this planar frame portion 22 as shown in FIG. 2. Inward of each offset 30, along a vertical centerline, is a clearance hole 32. The clearance holes 32 are spaced from each other at a distance corresponding to the spacing of the screw holes 14 on the receptacle plate 10 shown in FIG. 5.

Inward of each of the clearance holes 32 is a first row of holes 36 which define the start of a bendable tab portion 34, providing linear means for facilitating bending. A second similar row of holes 38 is positioned further inward, at a distance from the first row 36 substantially equal to the thickness of the wallboard material. Still further inward is a screw-engaging aperture 40, smaller in diameter than the clearance hole 32. The screw-engaging aperture 40 is positioned along the same vertical centerline as the clearance hole; its distance from the second row of holes 38 equals the distance of the clearance hole 32 from the first row of holes 36. Each tab portion 34 terminates in a clamping inner end 42 which extends beyond its screw-engaging aperture 40 to a cut formed by blanking out a central portion of the subplate 20 between the lines of severance which define the longer inner edge parts 26.

Figure 3:
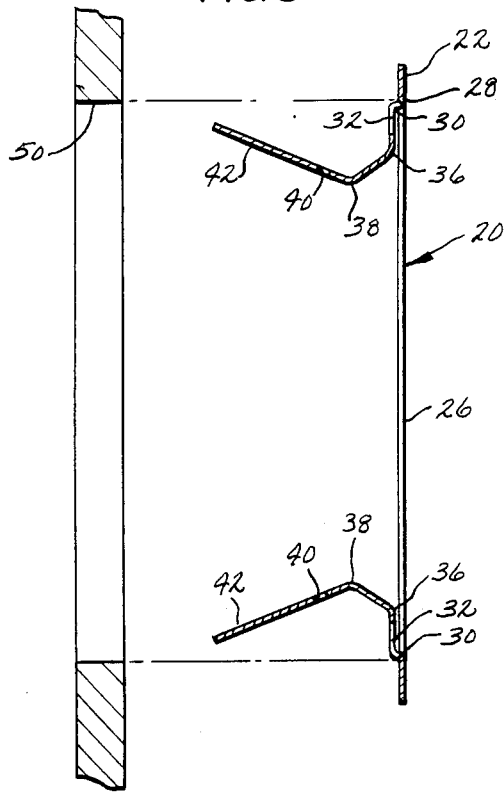
FIG. 3 is a side edge view of the subplate corresponding to FIG. 2, partially bent along the bend lines shown in FIG. 1, shown adjacent to a wall opening.
Figure 4:
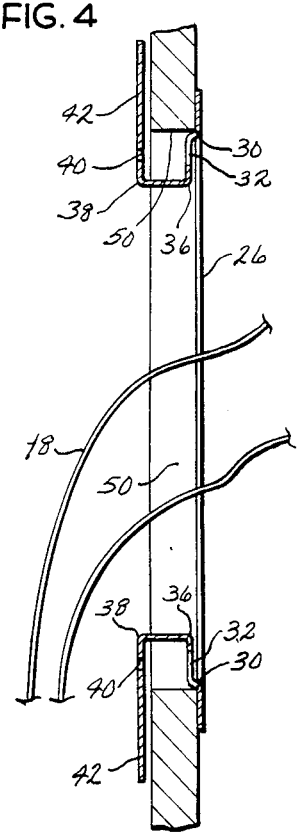
FIG. 4 is a cross-sectional view, taken along line 4—4 of FIG. 1, of the subplate with the flanges completely bent, in position in a wall opening preliminary to installation of the electric receptacle plate.

For the method of installing the subplate 10, see FIGS. 3–5.

An elongated rectangular opening 50 is first cut into the wallboard material; its size corresponds to the dimensions of longer and shorter inner edges 26, 28 of the subplate frame portion 22. Of particular significance is the longer dimension of the opening 50; it exceeds the distance of the plate's screw holes 14 from each other.

The tab portions 34 of the subplate 20 are initially bent inward at the first row of holes 36 and backward at the second row of holes 38 to angles which approximate 45°, to permit installation within the wall opening as shown by the phantom lines of FIG. 3. The frame portion 22 is then positioned about the wall opening 50; the linear inward offsets 30 serve as locators to establish its precise vertical position, while the full-width tab portions 34 establish its precise sideward location. Using his fingers, the installer further bends the tab portions 34 approximately 90° at both rows of holes 36, 38, bringing the screw-engaging apertures 40 into registration with the clearance holes 32 and positioning the clamping inner ends 42 behind the wall, as in FIG. 4. Low-voltage wiring 18 is drawn through the wall opening 50 and subplate 20 as illustrated in FIG. 4, and connected to the telephone sockets 16 mounted on the receptacle plate 10 shown in FIG. 5.

The receptacle plate 10 is then placed with its sloping framing margin 12 fitted around the frame portion 22 of the subplate 20, as shown in the broken-away portion of FIG. 5. Mounting screws 52 are inserted through the screw holes 14 of the receptacle plate 10 and the clearance holes 32, and into the screw-engaging apertures 40 of the subplate 20. When the mounting screws 52 are tightened, as shown in FIG. 5, the clamping inner end 42 of each tab portion 34 is drawn tightly against the inner surface of the wall.

From the foregoing description, variations in design will become apparent. For example, the inward offsets 30, which are readily formed, along with the lines of severance, preliminarily prevent the subplate 20 from "floating" in vertical position (before the ends 42 of the tabs 34 can be clamped); if this advantage is dispensed with, other configurations may be selected. In the claims which follow, the term "elongated rectangular" is to be taken to mean "not square."

I claim:

1. For use in installing a low-voltage outlet, of the type mounted onto a receptacle plate, over an opening cut in board-type wall material, the receptacle plate having a pair of screw holes spaced inward of opposite side edges,
   a subplate formed of bendable sheet metal and comprising
   a planar frame portion adapted to fit beneath such electric receptacle plate and having a pair of clearance holes spaced from each other a distance corresponding to the distance of such screw holes of such receptacle plate, the frame portion further having
   a pair of tabs projecting inward of said clearance holes, each tab having, progressively inward from said clearance holes,
   first linear means for facilitating bending therealong,
   second linear means for facilitating bending parallel to and spaced from the first said means a distance substantially equal to the thickness of such wall material, and
   a screw-engaging aperture spaced inward from said second linear means a distance substantially equal to the distance from said clearance hole to said first linear means, said screw-engaging aperture and said clearance hole being located along a line perpendicular to said linear means for facilitating bending, whereby on bending the tabs inwardly along said first linear means approximately 90° and backward along said second linear means approximately 90°, the screw-engaging aperture is brought into registration with the clearance hole,
   each tab further having a clamping end portion extending inward beyond said screw-engaging aperture.

2. A subplate as defined in claim 1, further having offsets from said planar frame portion outward of said clearance holes,
   whereby to aid in positioning the subplate relative to such wall opening.

3. A subplate as defined in claim 2, said tabs being of such width as to extend substantially the entire width of such wall opening, whereby, on bending along said first linear means, to further aid in positioning the subplate relative to such wall opening.

4. A subplate as defined in claim 1, wherein said linear means for facilitating bending comprises aligned holes through said subplate.

5. For use in installing a low voltage outlet of the type mounted onto a receptacle plate over an elongated rectangular opening cut in sheet-like wall material, the receptacle plate having a rectangular framing margin for spacing it from a wall surface and a pair of screw holes inwardly adjacent to such framing margin,
   a rectangular subplate formed of bendable sheet metal and comprising
   an elongated frame portion adapted to fit beneath such electric receptacle plate and having a frame inner edge substantially corresponding to the wall opening,
   lines of severance extending along the longer inner edge parts of said frame portion, whereby to define the width of bendable tab portions, and
   a cut extending across from one of said lines of severance to the other, there being spaced progressively inward from the shorter inner edge parts of said frame,
   a clearance hole,
   first linear means parallel to said shorter inner edge parts for facilitating bending, whereby to delineate the outer ends of said bendable tab portions,
   second said linear means for facilitating bending spaced from the first said means a distance substantially equal to the thickness of such wall material,
   a screw-engaging aperture spaced inward from said second linear means a distance substantially equal to the distance from said clearance hole to said first linear means, and
   a clamping inner end portion extending beyond said aperture, to said cut,
   whereby to clamp against the inner surface of such wall when the subplate is installed in said wall opening by being bent inwardly and backward substantially 90° along each of said linear means, the receptacle plate is applied outwardly thereof, and clamping forces are exerted by screws through such receptacle plate and said clearance holes and said screw-engaging apertures.

6. The process of mounting a low-voltage outlet receptacle plate, of the type having screw holes spaced inward of opposite side edges, on a board-type wall, comprising the steps of
   cutting in the wall an opening generally corresponding to, but smaller than, the receptacle plate, the opening exceeding the spacing of such screw holes from each other,
   placing about such opening a subplate having a pair of clearance holes whose spacing from each other corresponds to the spacing of such receptacle plate screw holes, and having a pair of bendable tabs projecting inward from such clearance holes toward each other,
   forming two 90° bends on said tabs, the first bend being inward into such wall opening and the second bend being backward, whereby the ends of said tab are positioned behind such wall,
   drawing low voltage wiring through such wall opening and subplate, and connecting such wiring to such outlet receptacle plate, placing the receptacle plate against the subplate with its holes in registration with the clearance holes of the subplate,
inserting mounting screws through both sets of holes and thence through the wall opening, and screwing said screws through those portions of the tabs between said second bends and said tab ends, whereby tightening the screws draws the tab ends clampingly against the inner wall surface.

* * * * *